United States Patent Office 2,874,193
Patented Feb. 17, 1959

2,874,193
ALKYLATION OF ORTHO-ALKYL PHENOLS

Renger Dijkstra, Amsterdam, Netherlands, assignor to Shell Development Company, New York, N. Y., a corporation of Delaware No Drawing. Application September 26, 1956
Serial No. 612,113

Claims priority, application Netherlands October 20, 1955

5 Claims. (Cl. 260—624)

This invention relates to the alkylation of phenols, and particularly to a process for preparing mono-alkyl phenols. More specifically, this invention relates to the catalytic alkylation of phenols with olefins in order to prepare primarily ortho-substituted mono-alkyl phenols.

The presence of the hydroxyl group upon the benzene ring in such compounds as phenol tends to control the further substitution on the ring in such a way that subsequent constituents of hydroxyl-substituted benzenes add on in the ortho- and para-positions relative to the hydroxyl group. In the case of phenol, the activating influence of the sole hydroxyl group renders the ortho- and para-positions to be activated in different degrees, and in general the para-position tends to be the more active. Thus, upon nitration 60% of the substitution occurs in the para-position to yield 4-nitrophenol, and only 40% of the substitution takes place at the ortho position to produce 2-nitrophenol.

Substituted alkyl phenols have considerable industrial utility because of their antioxidant properties, as well as for the characteristic of flexibility they lend to phenol-formaldehyde resin compositions. They are also useful intermediates in the preparation of detergents. Although alkyl phenols substituted only in the ortho-position have properties superior to those of para-substituted alkyl phenols in antioxidant applications because of the greater influence of the free para-position, such ortho-substituted alkyl phenols have been produced in uneconomically small quantities by known alkylation processes. Thus, for example, in U. S. Patent 2,514,419, which describes a process for the catalytic alkylation of phenols with olefins, only slightly over 20% of the product of the disclosed process is the ortho-substituted alkyl phenol.

In the lower alkyl phenols the mixture of ortho and para compounds can be divided into the separate isomers by distillation. In the case of the higher alkyl phenols such separations are very incomplete, however, since many isomers are formed in the alkylation, and the boiling ranges of some of the ortho-isomers and para-isomer fractions overlap. As a consequence, it is extremely desirable to have a selective alkylation process for the preparation of ortho-substituted alkyl phenols in which little or no para-isomer is formed.

It is an object of this invention to provide an improved process for the alkylation of phenols. It is a further object of this invention to provide a catalytic process for the alkylation of phenols with olefins. A still further object of the present invention is the provision of a process for preparing mixtures of mono-alkylated phenols consisting mostly of ortho-substituted mono-alkyl phenols. Another object of the invention is the provision of an efficient process for the production of ortho-substituted alkyl phenols from olefins having between 8 and 20 carbon atoms. Still another object is the employment of a novel fluoride-pretreated catalyst for the production of ortho-substituted mono-alkyl phenols from olefins and phenols. Further objects and advantages of the invention will be apparent from the following description of the new process.

These objects are accomplished in the invention by alkylating phenols with olefins while the reactants are in contact with a solid absorbent aluminum silicate catalyst which has been pretreated with hydrogen fluoride or a decomposable salt thereof. Although the use of aluminum silicate catalyst for the alkylation of phenols is known, it has been unexpectedly found that such fluoride pretreatment changes the product from the predominantly para-alkyl phenols obtained with the untreated aluminum silicate catalyst to a mixture of alkyl phenols in which the ortho-isomer predominates. Moreover, the alkylation reaction takes place readily and efficiently with the aid of the fluoride-pretreated catalyst at comparatively low temperatures and pressures. It has also been found that the alkylation may take place in the presence of a solvent or diluent which is inert to the catalyst and reactants, and so does not interfere with the course of the reaction.

The process of the invention gives very good results with olefins containing 8–20 carbon atoms, and produces ortho-alkyl phenols with long-chain substituents having extremely useful properties as anti-oxidants, and as detergents after reaction in usual fashion with ethylene oxide or the like.

In the preferred embodiment of the invention, the aluminum silicate catalyst is treated with hydrogen fluoride before being used in the reaction. Following the pretreatment, the aluminum silicate is characterized by a fluorine content which preferably includes from about 0.25% to 30% by weight of fluorine. For best results, it is desirable to use a catalyst containing between about 1% and 10% by weight of fluorine.

A mixture of the olefin and a phenol is then brought into contact with the pretreated catalyst, and the mixture and catalyst are stirred together and heated to reaction temperature, which is preferably between 150° C. and 300° C. In order to prevent the undesirable oxidation of the reactants during the reaction, it is frequently desirable to conduct the reaction under a blanket of an inert gas, such as nitrogen. At the close of the reaction, the catalyst is separated from the reaction mixture and the products and reactants separated by such well-known methods as fractional distillation. The resulting mixture of alkylated phenols will be found to comprise mostly the ortho isomer, with only small amounts of the para isomer contained therein.

The aluminum silicate catalyst subjected to the pretreatment may take a variety of well known forms. The most frequently encountered catalyst of the aluminum silicate type is that prepared by treating silica gel with an aluminum salt solution, and drying the silica aluminum material so prepared. Both synthetic and naturally-occurring silica-alumina compositions may be used in the preparation of the catalyst of this invention.

The catalyst may be pretreated with fluoride in a number of ways in order to give it the desired fluoride content. One convenient manner of pretreatment is to immerse the granular silicate in aqueous hydrofluoric acid, either at room temperatures or higher temperatures, and subsequently recover the catalyst and dry it. Alternatively, the granular silica-alumina catalyst may be exposed to attack by gaseous hydrogen fluoride, at low or high temperatures.

A somewhat modified form of treatment with fluoride which avoids the handling of the highly dangerous hydrofluoric acid consists in soaking the catalyst with an aqueous solution of ammonium fluoride, and then drying the impregnated granular material at 110° C. or so. After the water has been driven off the catalyst is heated for an extended time, such as 2–3 hours, at a temperature such that the ammonium fluoride will decompose to ammonia and hydrogen fluoride. Although some decomposition of the ammonium fluoride does take place at 110° C., decomposition will be completed if the second temperature selected is on the order of 500° C. The hydrogen fluoride formed in the decomposition serves to treat the catalyst; and considerable amounts of fluoride may be incorporated into the alumina-silica in this manner. Upon recovery of the catalyst prepared by this treatment or by treatment with aqueous or gaseous hydrogen fluoride, it will be found that large amounts of fluoride, up to about 30% by weight may be incorporated in this manner.

While the exact nature of the combination between the fluorine atoms and the aluminum silicate catalyst is not definitely known, the fluorine appears to be chemically combined with the catalyst, probably in the form of an aluminum fluoride or aluminum fluosilicate compound.

The reactants which are to be employed in the present invention comprise monoolefins and hydroxy benzene compounds having a replaceable hydrogen atom on the carbon atom in the ortho position relative to the hydroxyl group. Included in this group of compounds are phenol itself, and phenols having other substituents in the 2,3 or 4 position. Among these compounds are alkyl or alkenyl phenols such as o-cresol, m-cresol, o-ethylphenol, o-tert-butylphenol, o-allylphenol, etc., polycyclic phenols such as alpha- or beta-naphthol, 1-, 2- or 3-anthrol, o-cyclo-pentylphenol, o-phenylphenol, etc., amine-substituted compounds such as m-aminophenol, halosubstituted phenols such as o-bromophenol, nitrophenols, such as m-nitrophenol, and such other substituted phenols as salicylaldehyde and catechol. Although all monoolefins, whether straight chain or branched chain, may be used in the process of the invention, the process is most usefully employed in the alkylation of phenols with monoolefins having 8–20 carbon atoms per molecule. The monoolefins having 14–18 carbon atoms are preferably used in this invention for the alkylation of phenols. For example, the 18-carbon atom olefin n-hexadecene-1 may be particularly easily reacted with phenol to yield ortho-hexadecyl phenol by the catalytic process of this invention. Other suitable olefins include isobutylene, pentene-1, 3-methylbutene-1, heptene-1, isooctene, allyl benzene, styrene, etc. Preferably the olefin and phenol reactants will be mixed in equimolar proportions, although either reactant may be present in slight excess such as up to 10% or more without adversely affecting the alkylation.

When the reaction is conducted in a batchwise manner, the preferred amount of pre-treated catalyst which may be used in conjunction with the mixture of reactants is 10% by weight of the mixture. However, from 1% to 20% by weight of the catalyst may be employed, depending on the nature of the catalyst, the amount of fluorine therein, and the temperature at which the alkylation is conducted.

Since the preferred temperatures of this process lie between 150° C. and 300° C., the reactant mixture will usually be liquid at these temperatures. In general, the reaction can conveniently be carried out at atmospheric pressures at these temperatures, but it may also be conducted at sub-atmospheric or super-atmospheric pressures, depending on the reactants, the reaction temperatures and the type of equipment selected for the alkylation process. Inasmuch as the reactants themselves are generally liquids at the reaction temperatures, there is usually no need for a mutual solvent, but for purposes of temperature control inert solvents or diluents may be employed. These are preferably such non-reactive high-boiling liquids as the long chain paraffins such as n-nonane, n-decane, n-undecane, n-dodecane, n-hexadecane, n-octadecane and the like. It is also frequently desirable to conduct the reaction in the absence of air, and such non-reactive inert gases as nitrogen or carbon dioxide may be used to blanket the reaction.

The process may be conducted in a batchwise manner, by adding the reactants to the pretreated catalyst in a kettle wherein the alkylation is allowed to take place. Alternatively, the phenol-olefin feed mixture may be passed continuously through a stationary bed of the pretreated granular aluminum silicate, or other means may be provided for bringing the reactants into contact with the catalyst under the reaction conditions described above.

The following examples illustrate the process of the invention in some of its advantageous embodiments. In these examples, the parts given are by weight.

Example 1

Granular aluminum silicate catalyst, consisting of approximately 12% by weight of $Al_2O_3$ and approximately 80% by weight of $SiO_2$, was pretreated by immersing it at room temperature in aqueous hydrofluoric acid. The catalyst was then dried, and a portion analyzed for fluoride content. It was determined that the catalyst had a fluorine content of 1% by weight.

224 parts of n-hexadecane-1 (1 mol), 113 parts of phenol (1.1 mols) and 34 grams of the pretreated catalyst were added to a glass flask provided with a stirrer, cooling coils and a gas inlet tube. While stirring and bubbling nitrogen through the reactants, the contents of the flask were heated to 180°–190° C. and that temperature was maintained for four hours. At the end of that time the contents of the flask were cooled and filtered to remove the catalyst, and the resulting mixture was fractionated.

The conversion of the hexadecene was 67%, of which 53% was converted into a mixture of mono-hexadecane phenol isomers. The mixture comprised 170 parts of a fraction boiling between 384° C. and 391° C. and consisting of secondary hexadecane phenol, 92% of which was ortho-isomer and 8% the para-isomer.

Example 2

An aluminum silicate catalyst was treated with aqueous hydrogen fluoride as in the previous example, but the treatment was extended until analysis of the catalyst showed that its fluoride content was 5%.

The catalyst so prepared was then mixed in a flask with phenol and n-hexadecene-1 in substantially the proportions of the previous example, and the mixture heated with stirring under nitrogen for four hours. In this experiment the temperature of the reaction was maintained at 260° C.

After cooling and filtering the reaction mixture, it was determined that the n-hexadecene-1 had been 100% converted into hexadecyl phenols, of which the mono-alkyl isomers comprised 73%. These isomers, boiling between 380° C. and 390° C., had an ortho-hexadecyl phenol content of 90%.

I claim as my invention:

1. A process for the preparation of an ortho-substituted monoalkyl phenol, which comprises pretreating an aluminum silicate catalyst with hydrogen fluoride until it contains from about 1% to about 5% by weight of chemically combined fluorine, and reacting a monoolefin having from 14 to 18 carbon atoms with a substantially equimolar amount of phenol in intimate contact with 1% to 20% by weight, based on the reactants, of said catalyst, at a temperature between 150° C. and 300° C., and at atmospheric pressure.

2. In the process of claim 1, the pretreatment of the aluminum silicate catalyst which comprises contacting said catalyst with aqueous hydrofluoric acid until it contains from about 1% to about 5% by weight of chemically combined fluorine, and drying said catalyst.

3. In the process of claim 1, the pretreatment of the aluminum silicate catalyst which comprises contacting said catalyst with gaseous hydrogen fluoride until it contains from about 1% to about 5% by weight of chemically combined fluorine.

4. In the process of claim 1, the pretreatment of the aluminum silicate catalyst which comprises impregnating it with an ammonium salt of hydrofluoric acid, and heating the impregnated catalyst at a temperature at which the salt decomposes until it contains from about 1% to about 5% by weight of chemically combined fluorine.

5. A process for the preparation of an ortho-hexadecyl phenol, which comprises pretreating an aluminum silicate with hydrogen fluoride until it contains from about 1% to about 5% by weight of chemically combined fluorine, and reacting n-hexadecene-1 with a substantially equimolar amount of a monohydroxy monocyclic phenol having a replaceable hydrogen atom on carbon atoms ortho and para to the hydroxy substituent, in intimate contact with about 10% by weight, based on the reactants, of said catalyst, at a temperature between 150° C. and 300° C., and at atmospheric pressure.

References Cited in the file of this patent

UNITED STATES PATENTS

| | | |
|---|---|---|
| 2,331,473 | Hyman | Oct. 12, 1943 |
| 2,506,923 | Hoekstra | May 9, 1950 |
| 2,516,152 | Schulze et al. | July 25, 1950 |
| 2,615,056 | Nickels | Oct. 21, 1952 |
| 2,655,544 | McNulty et al. | Oct. 13, 1953 |
| 2,655,547 | Bryner | Oct. 13, 1953 |
| 2,698,867 | Bos | Jan. 4, 1955 |